May 12, 1964     R. B. CAMPBELL     3,132,869
FLUID PRESSURE RESPONSIVE SEAL ASSEMBLY
Filed March 13, 1961
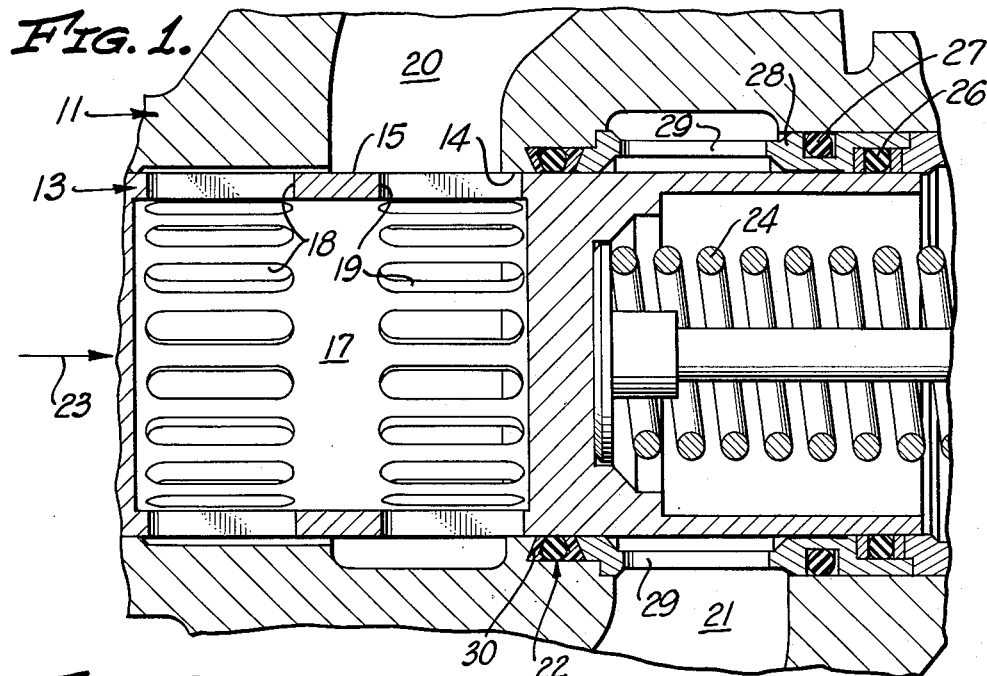
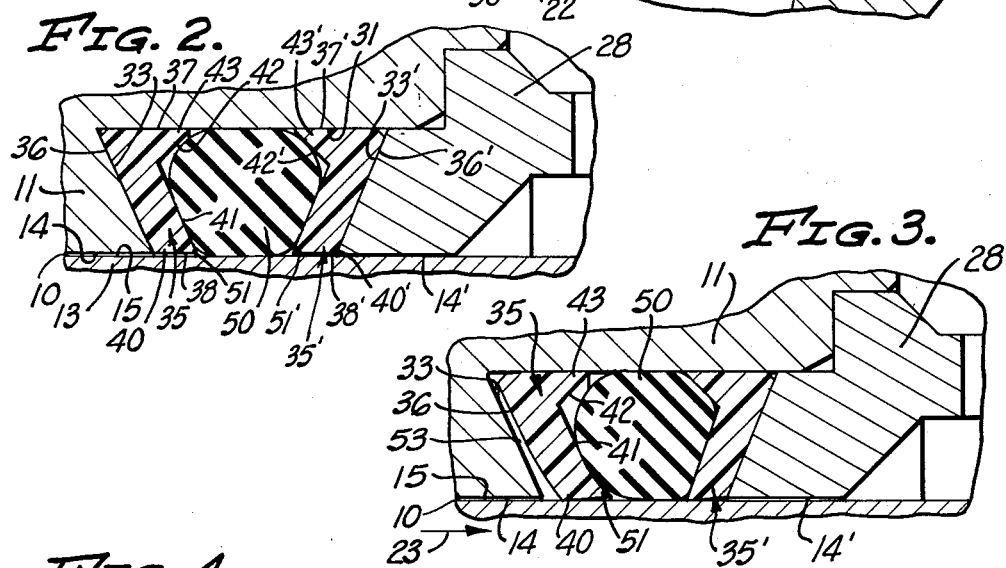
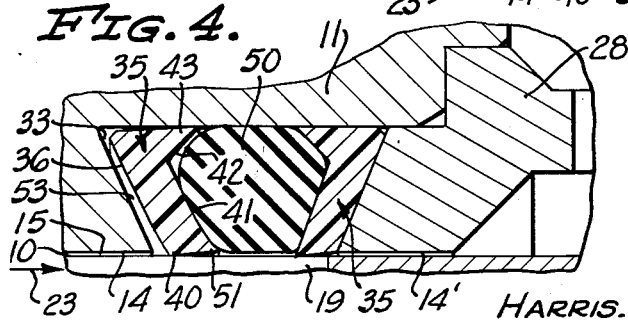
INVENTOR
RODNEY B. CAMPBELL
BY HIS ATTORNEYS
HARRIS, KIECH, RUSSELL & KERN

United States Patent Office 3,132,869
Patented May 12, 1964

3,132,869
FLUID PRESSURE RESPONSIVE SEAL
ASSEMBLY
Rodney B. Campbell, Glendale, Calif., assignor to
Malcolm R. Maben, Burbank, Calif., as trustee
Filed Mar. 13, 1961, Ser. No. 95,130
3 Claims. (Cl. 277—171)

This invention relates to annular fluid seals interposed between relatively movable members having a clearance therebetween and in which there may be at times a substantial fluid pressure differential across the seal.

The invention is particularly useful when employed in a fluid valve adapted to open and close a fluid line carrying high fluid pressures and will be described in conjunction therewith. However the invention has utility in other applications and I do not intend to be limited to the specific embodiment described herein.

Such valves conventionally have axially spaced inlet and outlet chambers connected to similarly spaced inlet and outlet ports, with a tubular piston axially movable from a first position in which piston ports communicate only with the inlet chamber to a second position in which the piston ports communicate with both the inlet and outlet chambers to permit a flow of fluid from the inlet chamber through certain of the piston ports and into and through the piston and out other piston ports to the outlet chamber.

Such a device normally provides a slight clearance between the piston and the bore of the housing to permit free axial movement of the piston. An annular fluid seal is required between the inlet and outlet chambers to prevent fluid leakage therebetween. The ported portion of the piston moves across this annular seal.

Attempts have been made to use for such an annular seal either conventional cup-type packings or O-rings. Using cup-type packings, it has been found that such a valve is limited to low pressure service because, first, cup packings have an inherently high coefficient of friction and at higher pressures they require an excessive actuating force to move the piston, and, second, higher pressures tend to push the lip of the cup packing down into the radial ports of the piston as they pass through the cup packing, the latter being thus quickly cut, chipped or abraded to provide undesired leakage therepast requiring early replacement of the packing. Such a valve with a conventional-ring seal is limited to low rates of fluid flow therethrough because a high flow rate tends to suck the O-ring out of its groove if large-size holes or slots are used for the piston ports, also cutting and chipping the O-ring and quickly rendering it unfit for service. If small piston holes or slots are used to prevent such injury to the O-ring, the fluid pressure drop across the valve becomes excessive.

It is a primary object of this invention to provide a novel fluid seal for such a valve device or for similar environments, which seal obviates the disadvantages of conventional seals in respects pointed out above or otherwise.

In particular, it is an object of the invention to provide a fluid seal construction which can be used in a valve in which the piston ports are large, to accommodate high flow rates, and in which higher fluid pressures, up to 5000 p.s.i., may be employed without substantial cutting, chipping or abrading of the sealing member, which may be a conventional O-ring.

Another object of the invention is to dispose a ring element on one or both sides of an O-ring within an annular groove in one member facing an engaging surface of the other member to be sealed, such ring element rolling, shifting or deforming in response to external pressures applied to the ring element. Such external pressure may be a fluid pressure resulting from a pressure differential across the ring element, a mechanical pressure induced by friction against said engaging surface of said other member, or both.

It is an object of the invention to employ such rolling, shifting, or deforming of a ring element to effect a seal between the ring element and the engaging surface.

It is also an important object of the invention to employ such rolling, shifting or deforming of the ring element to exert a pressure on the O-ring tending to cam it away from the engaging surface, thereby reducing or substantially eliminating sealing or pressural engagement therebetween. Still a further object is to employ such lifting action to lift the O-ring with respect to a ported engaging surface thus eliminating the wear and tear on the O-ring as such ports move therepast.

Other objects and advantages of the present invention will appear from the following specification and the drawings, which are for the purpose of illustration only, and in which:

FIG. 1 is a sectional view through a portion of a valve utilizing the present invention;

FIG. 2 is an enlarged sectional view of a portion of my fluid seal device showing the same assembled but without any fluid pressure differential thereacross;

FIG. 3 is a view similar to FIG. 2 but roughly illustrates the position of the parts in response to a substantial fluid pressure differential across the seal from left to right; and FIG. 4 is a view similar to FIG. 3 but roughly illustrating the positions the parts assume in response to axial movement of the piston relative to the seal in one direction.

Referring particularly to FIGS. 1 and 2 the invention will be described with reference to sealing an annular clearance space 10 between one member, here an outer member 11 of a slide valve, and another member, here an inner or piston member 13 adapted to slide in a bore of the outer member. The clearance space 10 is between coaxial, mutually confronting circular, i.e., cylindrical, 14 and 15 provided respectively by the bore and the outer surface of the inner or piston member 13. In the valve to be described the inner member 13 is a piston member providing an endwardly-closed pressure chamber 17 having radial ports 18 and 19 shown as longitudinally extending slots disposed in two axially spaced series and opening on the circular surface 15. The outer member 11 comprises the valve body and provides inlet and outlet chambers 20 and 21 opening on the bore at axially spaced positions. The seal of the invention is indicated generally by the numeral 22 and can seal the clearance space 10 in a zone between the inlet and outlet chambers 20 and 21.

The valve is shown in closed position in FIG. 1, the pressure chamber 17 being in communication with the inlet chamber 20 through the ports 19. If a valve-actuating pressure is applied to the inner or piston member 13 in the direction of the arrow 23 the ports 19 will sweep across the seal 22 before the valve reaches an open position in which the ports 18 communicate with the inlet chamber 20 and the ports 19 communicate with the outlet chamber 21. Opening movement of the inner or piston member 13 can be against a spring 24 acting in a known manner.

One of the main problems solved by the invention is the prevention of undue wear on the seal 22 as the ports 19 sweep therebeneath. As previously mentioned, conventional seals in this position are quickly destroyed or tend to be sucked out of the receptive groove at a time when the ports 19 lie opposite such groove and high pressure fluid sweeps through the ports from the inlet chamber 20 to the outlet chamber 21. The same problem does not arise with respect to conventional O-rings 26 and 27 respectively in inwardly and outwardly facing grooves of a spacer member 28 having arms 29 traversing the outlet chamber 21. This is because there is either no relative movement between the elements sealed by these O-rings or, as in the case of the O-ring 26, the ports 19 do not sweep thereacross. The spacer member 29 is in effect a part of the outer member 11, being fixedly held in its operating position of FIG. 1 by means not shown. Its left-hand end as viewed in FIGS. 1 and 2 provides a bore the interior surface of which is indicated by the numeral 14', being a continuation of the circular surface 14.

The invention includes an annular groove 30 (FIG. 1) of particular shape, best shown in FIGS. 2–4, preferably of trapezoidal shape in cross-section. This annular groove faces the circular surface 15 of the inner member, constituting the aforesaid engaging surface, and is preferably bounded by a peripheral outer wall 31 and two opposed sloping annular end walls 33 and 33' which may be cut in the same member but which are here shown as respectively cut in the outer member 11 and the spacer member 28.

Two ring elements 35 and 35', shaped identically but of opposite hand, are disposed in the annular groove 30 in initially spaced relationship as shown in FIG. 2. The ring 35 will be specifically described, corresponding elements of the ring 35' being indicated by primed numerals. These ring elements are preferably formed of a pressure-deformable material, preferably a plastic such as "Teflon" (polytetrafluoroethylene) or "Kel–F" (polytrifluorochloroethylene) or material of similar characteristics.

In the preferred form, the ring element 35 is initially shaped to have an outer face 36 of the same frusto-conical shape as the sloping annular end wall 33. Its outer peripheral surface 37 is preferably a cylindrical surface in surface contact with the peripheral wall 31 of the groove. Its innermost portion provides a circular surface 38 preferably of such diameter as to provide the same or a slightly greater clearance with respect to the circular surface 15 as that provided by the clearance space 10, the slightly greater clearance being preferred to allow for the greater thermal expansion and contraction of the ring element 35. That portion of the ring element 35 closest to the sloping annular end wall 33 comprises a heel portion 40 for a purpose to be described.

The inner face of the ring element 35 is preferably angular, comprising a sloping inner annular surface 41, preferably substantially parallel to the end wall 33, and a stop surface 42 extending between the surface 41 and the peripheral wall 31, preferably at an obtuse angle with respect to each. This provides an outer toe portion 43 functioning as later described. Best results will be obtained with the inner annular surface 41 angled in the neighborhood of about 20–30° with respect to a plane perpendicular to the axis of the members 11 and 13. An angle as low as about 12° may be used on low-pressure valves but for normal 500–3000 p.s.i. designs for oils an angle of about 24° is preferred. In high-pressure pneumatic valves employing O-rings of relatively small cross section an angle of about 30° will be found preferable. The angle of the stop surface 42 is not critical but is preferably about 45° with respect to such a plane. It will be noted that the surfaces 41 and 42 render the inner face of the ring 35 generally V-shaped in cross section and that the apex of the V is adjacent the peripheral wall 31 of the groove.

An O-ring 50, formed of rubber, neoprene or other elastomeric material preferably softer and much more easily deformable than the ring element 35, is disposed in the groove 30 between the ring elements 35 and 35'. This O-ring may be of the usual circular cross-section before insertion. While it is possible to insert the O-ring 50 into the groove through the narrow mouth formed by the converging annular surfaces 41, it is preferable to insert it while the spacer member 28 is retracted, this member being thereafter moved leftward into its position shown in the drawings and clamped in such position.

The O-ring 50 is of a size to be compressed against the circular or engaging surface 15 in initial sealing relationship. Its outer surface is compressed against the peripheral wall 31. Its side surfaces are compressed between the converging surfaces 41, 41'. Due to this confinement the O-ring 50 will assume a cross-sectional shape in assembled form approximately as shown in FIG. 2. In the preferred embodiment of the invention the stop surfaces 42, 42' are spaced from the sides of the thus-deformed O-ring to provide small spaces allowing freedom for the O-ring to move in this area.

It will thus be seen that the inner half of the O-ring cross-section provides a surface zone facing the circular surface 15 and that the innermost portion thereof forms a crest zone flattened to conform to the circular or engaging surface 15 and lying in sealing engagement therewith in the assembled position of FIG. 2. The outer half of the cross-section of the O-ring is substantially free of restraint except that resulting from engagement with the peripheral wall 31. It will also be seen that the ring element 35 provides a toe or leading portion 51 beneath the aforesaid surface zone of the O-ring but terminating short of the aforesaid crest zone thereof.

When the valve of FIG. 1 is in the "off" position shown and when the inlet chamber 20 is pressurized, the fluid pressure shifts the elements of the seal to the position shown approximately in FIG. 3. The high fluid pressure applied to the circular surface 38 of the ring element 35 causes the ring element to deform or roll upwardly and inwardly of the groove as viewed in the drawings. A tapered space 53 (FIG. 3) opens up between the end wall 33 of the groove and the outer face 36 of the ring element 35 on the high pressure side of the seal. The ring element 35 may actually be displaced axially of the groove as suggested in FIG. 3. In a manner of speaking, the ring element 35 thus tends to pivot about the now-somewhat-deformed outer toe portion 43, the leading portion 51 now pressing strongly against the corresponding surface zone of the O-ring, squeezing the O-ring between the ring elements 35 and 35', partially lifting the surface of the O-ring to reduce the area of the crest zone thereof in contact with the inner member 13 although not sufficiently to break the sealing contact therebetween. At the same time, the heel portion 40 of the ring element 35 is displaced toward the circular surface 15 of the inner member 13 and by proper design can be made to engage same to effect a partial seal, thus aiding the sealing action of the O-ring 50. The deforming or rolling of the ring element 35 forces the O-ring into pressural contact with the stop surface 42' of the other ring element 35'. Between the sealing action of the O-ring 50 and the heel portion 40 of the ring element 35 there will be no leakage past the seal to the outlet chamber 21.

When a pressure force is applied to the inner or piston member 13 in the direction of the arrow 23 it will move progressively to the right toward a valve-opening position. FIG. 4 shows the elements in an intermediate position and illustrates the additional displacement of the seal parts resulting from such relative movement of the members 11 and 13. As the movement starts, both the O-ring 50 and the heel portion 40 tend to deform or roll additionally by friction-induced forces, thereby increasing the sealing engagement of the heel portion against the surface 15 and further lifting the O-ring to reduce or eliminate its contact with the surface 15. This lifting is the result of the leading portion 51 being forced an additional distance beneath the O-ring because of the displacement of the ring element 35 both by frictional and fluid pressure forces. As the ports 19 move past the groove 30, the inlet pressure caged in the inner or piston member 13 further assists the ring element 35 in camming the O-ring 50 away from the engaging surface 15 so that it is completely disengaged therefrom while the ports 19 pass the groove. The stop wall 42' of the opposite ring element 35' serves to limit the lift and roll of the O-ring 50.

When the ports 19 have passed the groove, the O-ring 50 is immediately able to contract into sealing contact with that portion of the surface 15 between the series of grooves 18 and 19. With the valve now in fully open position, the pressure forces across the seal are nearly in balance thereby permitting the ring element 35 and the O-ring 50 to relax into essentially the same configuration as shown in FIG. 2.

If the inner or piston member 13 is stopped in mid-stroke, as for example when the valve is used for throttling, the flow velocity near the groove 30 will be quite high and, as previously discussed, there will be a tendency to suck the O-ring out of the groove. With the invention, however, the O-ring is retained in the groove by the pressure of the ring element 35 and the suck-out forces are not sufficiently great to allow the sealing surface of the O-ring to protrude from the groove to be damaged by the edges of the ports 19.

As the inner or piston member 13 is later moved leftward to close the valve, the motion of this member will cause the O-ring 50 to roll slightly in the opposite direction and the heel portion 40' of the ring element 35' will engage the circular surface 15. The frictional contact between the inner or piston member 13 and this ring will tend to displace or roll the latter to bring the leading portion 51' in lifting relationship with the O-ring thereby lifting it partially. As the inner or piston member 13 approaches its valve-closed position, the ends of the ports then approaching or passing under the O-ring, the pressure differential across the sealing means of the invention becomes greater and there will be a much higher pressure level inside the ports than immediately to the right of the sealing means. This pressure force further lifts the sealing surface of the O-ring out of contact with the circular surface 15 so that it is not damaged as it passes across the ports 19. As soon as these ports have passed the O-ring the latter immediately moves inwardly into sealing contact with the circular surface 15 to complete the shutting off of the flow.

Valves of the construction illustrated in the drawing have given long life in use and have been tested at hydraulic pressures of 5000 p.s.i. at flow rates up to about two times the rated capacity of a given connected pipe size without any signs of malfunctioning.

It will be apparent that if sealing is desired in only one direction of relative motion of the members 11 and 13, one of the ring elements 35, 35' alone can be used to some advantage. It will be apparent also that the invention is not limited to a sealing means used to seal a ported surface although it finds particular value in such an environment.

Various changes and modifications will be apparent to those skilled in the art and can be made without departing from the spirit of the invention as defined in the appended claims.

I claim:
1. In combination:
 (a) coaxial, relatively axially movable, inner and outer members respectively having cylindrical inner and outer surfaces;
 (b) said cylindrical surfaces confronting each other and one of them being provided with an opening therein;
 (c) the other of said cylindrical surfaces being provided therein with an annular groove coaxial with said members and confronting said one cylindrical surface;
 (d) said groove having a peripheral wall and having annular end walls converging toward said one cylindrical surface and making acute angles with a plane perpendicular to the axis of said members;
 (e) an O-ring in said groove and engageable with said peripheral wall of said groove and said one cylindrical surface; and
 (f) means, including two deformable and axially movable back-up rings disposed in said groove between said O-ring and said end walls of said groove, respectively and squeezing said O-ring therebetween in response to a pressure differential across said O-ring and in response to relative axial movement of said members, for camming said O-ring away from said one cylindrical surface to clear said opening therein.

2. In combination:
 (a) coaxial, relatively axially movable, inner and outer members respectively having cylindrical inner and outer surfaces;
 (b) said cylindrical surfaces confronting each other and one of them being provided with an opening therein;
 (c) the other of said cylindrical surfaces being provided therein with an annular groove coaxial with said members and confronting said one cylindrical surface;
 (d) said groove having a peripheral wall and having annular end walls converging toward said one cylindrical surface and making acute angles with a plane perpendicular to the axis of said members;
 (e) an O-ring in said groove and engageable with said peripheral wall of said groove and said one cylindrical surface;
 (f) means, including two deformable and axially movable back-up rings disposed in said groove between said O-ring and said end walls of said groove, respectively, and squeezing said O-ring therebetween in response to a pressure differential across said O-ring and in response to relative axial movement of said members, for camming said O-ring away from said one cylindrical surface to clear said opening therein;
 (g) said back-up rings being in engagement with said peripheral wall of said groove, respectively being in engagement with said end walls of said groove, and being disengaged from said one cylindrical surface, all with no pressure differential across said O-ring and no relative axial movement of said members;
 (h) said O-ring engaging said peripheral wall of said groove and said one cylindrical surface with no pressure differential across said O-ring and no relative axial movement of said members;
 (i) said back-up rings having concave inner end faces confronting and engaging said O-ring;
 (j) said inner end faces of said back-up rings being generally V-shaped in cross section; and
 (k) the V's of said inner end faces forming obtuse angles and the apices of the V's being closer to said peripheral wall of said groove than to said one cylindrical surface to provide said back-up rings with radially small toe portions adjacent said peripheral wall of said groove and radially large heel portions adjacent said one cylindrical surface.

3. In combination:
 (a) coaxial, relatively axially movable, inner and outer members respectively having cylindrical inner and outer surfaces;
 (b) said cylindrical surfaces confronting each other and one of them being provided with an opening therein;
 (c) the other of said cylindrical surfaces being provided therein with an annular groove coaxial with said members and confronting said one cylindrical surface;
 (d) said groove having a peripheral wall and having annular end walls converging toward said one cylindrical surface and making acute angles with a plane perpendicular to the axis of said members;
(e) an O-ring in said groove and engageable with said peripheral wall of said groove and said one cylindrical surface;
(f) means, including two deformable and axially movable back-up rings disposed in said groove between said O-ring and said end walls of said groove, respectively, and squeezing said O-ring therebetween in response to a pressure differential across said O-ring and in response to relative axial movement of said members, for camming said O-ring away from said one cylindrical surface to clear said opening therein;
(g) said back-up rings being in engagement with said peripheral wall of said groove, respectively being in engagement with said end walls of said groove, and being disengaged from said one cylindrical surface, all with no pressure differential across said O-ring and no relative axial movement of said members;
(h) said O-ring engaging said peripheral wall of said groove and said one cylindrical surface with no pressure differential across said O-ring and no relative axial movement of said members;
(i) said back-up rings having concave inner end faces confronting and engaging said O-ring;
(j) said inner end faces of said back-up rings being generally V-shaped in cross section;
(k) the V's of said inner end faces forming obtuse angles and the apices of the V's being closer to said peripheral wall of said groove than to said one cylindrical surface to provide said back-up rings with radially small toe portions adjacent said peripheral wall of said groove and radially large heel portions adjacent said one cylindrical surface;
(l) each of said heel portions being pivotally deformable relative to the corresponding toe portion, in response to a pressure differential across said O-ring and in response to relative axial movement of said members, to cam said O-ring away from said one cylindrical surface; and
(m) said inner end faces of said back-up rings having surfaces adjacent said one cylindrical surface which make angles of between about 12° and about 30° with planes perpendicular to the axis of said members.

References Cited in the file of this patent

UNITED STATES PATENTS

| | | |
|---|---|---|
| 2,427,787 | Hunter | Sept. 23, 1947 |
| 2,705,177 | Waring | Mar. 29, 1955 |
| 2,728,620 | Krueger | Dec. 27, 1955 |
| 2,739,855 | Bruning | Mar. 27, 1956 |

UNITED STATES PATENT OFFICE
CERTIFICATE OF CORRECTION

Patent No. 3,132,869                 May 12, 1964

Rodney B. Campbell

It is hereby certified that error appears in the above numbered patent requiring correction and that the said Letters Patent should read as corrected below.

Column 2, line 40, before "14" insert -- surfaces --; column 6, lines 8 and 9, after "respectively" insert a comma.

Signed and sealed this 15th day of September 1964.

(SEAL)
Attest:

ERNEST W. SWIDER
Attesting Officer

EDWARD J. BRENNER
Commissioner of Patents